(12) United States Patent
Yen et al.

(10) Patent No.: US 11,126,823 B2
(45) Date of Patent: Sep. 21, 2021

(54) OPTICAL FILM STACK, CHANGEABLE LIGHT SOURCE DEVICE, AND FACE SENSING MODULE

(71) Applicant: HIMAX TECHNOLOGIES LIMITED, Tainan (TW)

(72) Inventors: Yu-Feng Yen, Tainan (TW); Yin-Tung Lu, Tainan (TW); Chih-Yu Chuang, Tainan (TW); Han-Yi Kuo, Tainan (TW)

(73) Assignee: HIMAX TECHNOLOGIES LIMITED, Tainan (TW)

(*) Notice: Subject to any disclaimer, the term of this patent is extended or adjusted under 35 U.S.C. 154(b) by 0 days.

(21) Appl. No.: 16/697,181

(22) Filed: Nov. 27, 2019

(65) Prior Publication Data
US 2021/0158019 A1    May 27, 2021

(51) Int. Cl.
*G06K 9/00* (2006.01)
*G01N 27/22* (2006.01)
(Continued)

(52) U.S. Cl.
CPC ....... *G06K 9/00255* (2013.01); *G01N 27/228* (2013.01); *G01N 27/24* (2013.01);
(Continued)

(58) Field of Classification Search
CPC .. G06K 9/00255; G01N 27/24; G01N 27/228; G02F 1/13306; G02F 1/133504; G02F 2203/03; H04N 5/2256
See application file for complete search history.

(56) References Cited

U.S. PATENT DOCUMENTS

2010/0097551 A1    4/2010 Yamagishi et al.
2016/0266465 A1    9/2016 Rastegar
(Continued)

FOREIGN PATENT DOCUMENTS

CN    209167791    7/2019
CN    110119036    8/2019
(Continued)

OTHER PUBLICATIONS

"Search Report of Europe Counterpart Application", dated Mar. 27, 2020, p. 1-p. 9.
(Continued)

*Primary Examiner* — Yogesh K Aggarwal
(74) *Attorney, Agent, or Firm* — JCIPRNET

(57) ABSTRACT

An optical film stack including a DOE, a first detecting circuit layer, a liquid crystal changeable diffuser, and a conductive structure is provided. The first detecting circuit layer is disposed on the DOE. The liquid crystal changeable diffuser is disposed beside the DOE and includes a first transparent substrate, a second detecting circuit layer, a second transparent substrate, a third detecting circuit layer, and a liquid crystal layer. The second detecting circuit layer is disposed on the first transparent substrate. The second transparent substrate is disposed beside the first transparent substrate. The third detecting circuit layer is disposed on the second transparent substrate. The liquid crystal layer is disposed between the first transparent substrate and the second transparent substrate. The conductive structure electrically connects the first detecting circuit layer, the second detecting circuit layer, and the third detecting circuit layer.

17 Claims, 8 Drawing Sheets

(51) Int. Cl.
  *G01N 27/24* (2006.01)
  *G02F 1/133* (2006.01)
  *G02F 1/1335* (2006.01)
  *H04N 5/225* (2006.01)

(52) U.S. Cl.
  CPC .... *G02F 1/13306* (2013.01); *G02F 1/133504* (2013.01); *H04N 5/2256* (2013.01); *G02F 2203/03* (2013.01)

(56) References Cited

U.S. PATENT DOCUMENTS

| | | | |
|---|---|---|---|
| 2017/0003539 A1* | 1/2017 | Nystrom | G02F 1/134309 |
| 2018/0283984 A1 | 10/2018 | Chen et al. | |
| 2019/0101381 A1 | 4/2019 | Chen et al. | |
| 2019/0121226 A1* | 4/2019 | Wu | G03B 21/2033 |
| 2019/0296522 A1 | 9/2019 | Johnson et al. | |

FOREIGN PATENT DOCUMENTS

| | | | |
|---|---|---|---|
| CN | 110119036 A | * | 8/2019 |
| CN | 110361870 | | 10/2019 |
| CN | 110361870 A | * | 10/2019 |
| EP | 3474072 | | 4/2019 |
| JP | 2008009224 | | 1/2008 |
| JP | 2013505472 | | 2/2013 |
| TW | 201915564 | | 4/2019 |
| TW | I677713 | | 11/2019 |

OTHER PUBLICATIONS

"Office Action of Taiwan Counterpart Application", dated Mar. 23, 2021, p. 1-p. 6.
"Office Action of Japan Counterpart Application", dated Mar. 2, 2021, p. 1-p. 3.

* cited by examiner

OPTICAL FILM STACK, CHANGEABLE LIGHT SOURCE DEVICE, AND FACE SENSING MODULE

BACKGROUND OF THE INVENTION

1. Field of the Invention

The invention relates to an optical film stack, a changeable light source device, and a face sensing module.

2. Description of Related Art

Solid state lasers have been widely used in portable electronic devices to serve as a light source for detection, e.g. the light source of a face recognition device, an auto-focusing camera, etc. The light source of a face recognition device emits a structured light, so as to form a light pattern on the face, which can be realized by adopting a diffractive optical element (DOE) disposed on the path of the laser beam from a solid laser emitter to split the laser beam into multiple sub-beams.

When the light source works normally, there are no safety issues. However, if the DOE or glass of the light source is cracked, or if there is a water drop on or inside the light source, the path of the laser beam will be changed, which may cause safety issues. For example, the energy of the laser beam may concentrated on some positions and may damage the eyes of a user.

SUMMARY OF THE INVENTION

Accordingly, the invention is directed to an optical film stack, which has a safety detection function.

The invention is directed to a changeable light source device, which has a safety detection function.

The invention is directed to a face sensing module, which has a safety detection function.

According to an embodiment of the invention, an optical film stack including a DOE, a first detecting circuit layer, a liquid crystal changeable diffuser, and a conductive structure is provided. The first detecting circuit layer is disposed on the DOE. The liquid crystal changeable diffuser is disposed beside the DOE and includes a first transparent substrate, a second detecting circuit layer, a second transparent substrate, a third detecting circuit layer, and a liquid crystal layer. The second detecting circuit layer is disposed on the first transparent substrate. The second transparent substrate is disposed beside the first transparent substrate. The third detecting circuit layer is disposed on the second transparent substrate. The liquid crystal layer is disposed between the first transparent substrate and the second transparent substrate. The conductive structure electrically connects the first detecting circuit layer, the second detecting circuit layer, and the third detecting circuit layer.

According to an embodiment of the invention, a changeable light source device including a light source and the aforementioned optical film stack is provided. The light source is configured to emit a light beam. The DOE is disposed on a path of the light beam. The liquid crystal changeable diffuser is disposed on the path of the light beam.

According to an embodiment of the invention, a face sensing module including a changeable light source device and a camera is provided. The camera is disposed beside the changeable light source device and configured to sense a reflected light formed by a face reflecting the light beam from the optical film stack.

In the optical film stack, the changeable light source device, and the face sensing module according to the embodiment of the invention, since a conductive structure is adopted to electrically connect the first detecting circuit layer, the second detecting circuit layer, and the third detecting circuit layer respectively disposed on the DOE, the first transparent substrate, and the second transparent substrate, the breakage or damage of any one of the DOE, the first transparent substrate, and the second transparent substrate or a water drop existing thereon may be detected. As a result, a safety detection function may be achieved.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
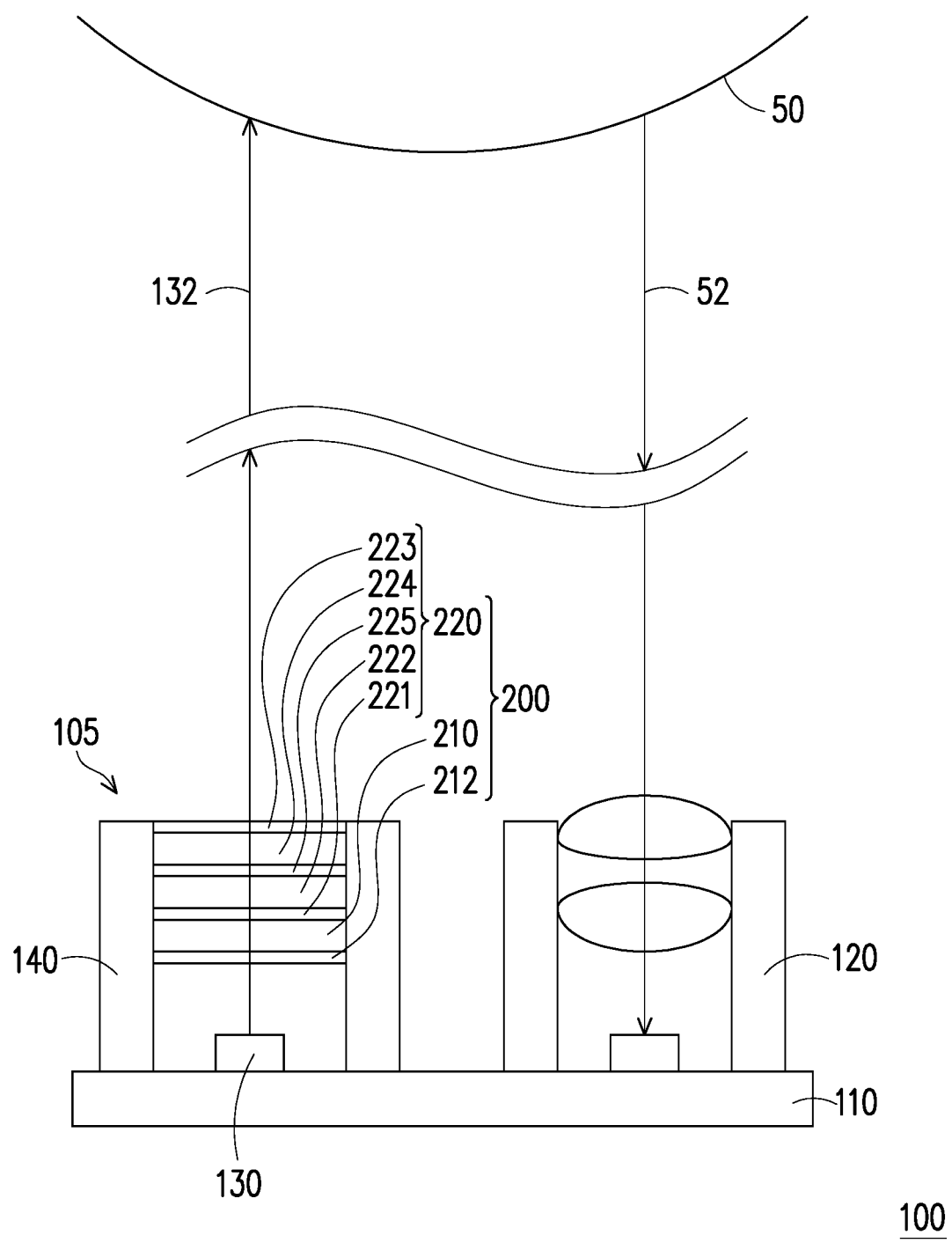
FIG. 1 is a schematic cross-sectional view of a face sensing module according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Figure 2A:
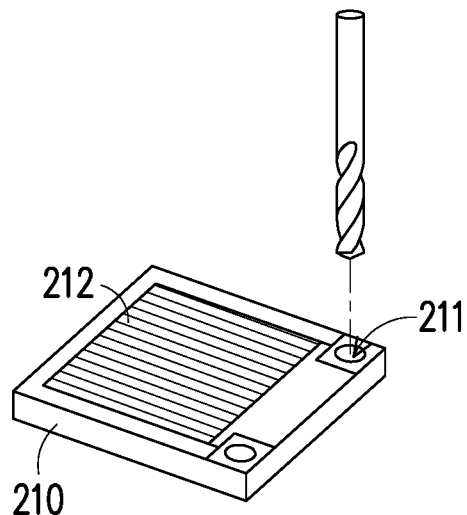
FIG. 2A, FIG. 2B, and FIG. 2C are schematic perspective views showing an assembling process of an optical film stack in FIG. 1.
Figure 2B:
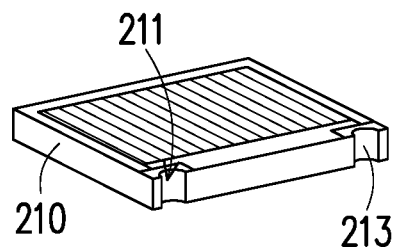
Figure 2C:
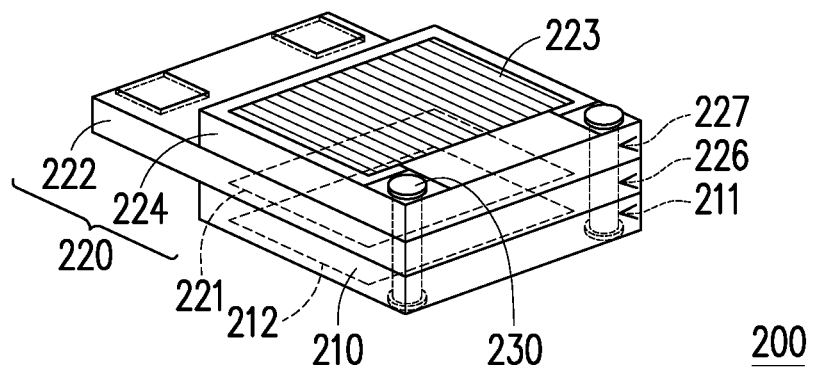

FIG. 1 is a schematic cross-sectional view of a face sensing module according to an embodiment of the invention. FIG. 2A, FIG. 2B, and FIG. 2C are schematic perspective views showing an assembling process of an optical film stack in FIG. 1. Referring to FIG. 1 and FIG. 2A to FIG. 2C, a face sensing module 100 in this embodiment includes a changeable light source device 105 and a camera 120. The changeable light source device 105 includes a light source 130 and an optical film stack 200. The light source 130 is configured to emit a light beam 132. In this embodiment, the light source 130 is a laser emitter, for example, a laser diode, a vertical-cavity surface-emitting laser (VCSEL), or an edge emitting laser, and the light beam 132 is a laser beam.

The optical film stack 200 includes a diffractive optical element (DOE) 210, a first detecting circuit layer 212, a liquid crystal changeable diffuser 220, and a conductive structure 230 (as shown in FIG. 2C). The DOE 210 is disposed on a path of the light beam 132. The first detecting circuit layer 212 is disposed on the DOE 210. The liquid crystal changeable diffuser 200 is disposed beside the DOE 210 and on the path of the light beam 132. The liquid crystal changeable diffuser 220 includes a first transparent substrate 222, a second detecting circuit layer 221, a second transparent substrate 224, a third detecting circuit layer 223, and a liquid crystal layer 225. The second detecting circuit layer 221 is disposed on the first transparent substrate 222. The second transparent substrate 224 is disposed beside the first transparent substrate 222. The third detecting circuit layer 223 is disposed on the second transparent substrate 224. The liquid crystal layer 225 is disposed between the first transparent substrate 222 and the second transparent substrate 224. The conductive structure 230 electrically connects the first detecting circuit layer 212, the second detecting circuit layer 221, and the third detecting circuit layer 223.

In this embodiment, the DOE 210 is configured to diffract the light beam 132 from the light source 130 to make the light beam 132 be a structured light. The liquid crystal layer 225 of the liquid crystal changeable diffuser 220 may be switched between a transparent state and a scattering state. When the liquid crystal layer 225 is switched to the transparent state, the structured light passes through the liquid crystal changeable diffuser 220, and the light beam 132 emerging from the liquid crystal changeable diffuser 220 is the structured light which irradiates a face 50 of a user to form a light pattern on the face 50. On the other hand, when the liquid crystal layer 225 is switched to the scattering state, the structured light is scattered by the liquid crystal layer 225 to form a flood light, and the light beam 132 emerging from the liquid crystal changeable diffuser 220 is the flood light which evenly irradiates the face 50 to provide uniform illumination on the face 50.

The liquid crystal changeable diffuser 220 may also have two electrode layers respectively on two opposite sides of the liquid crystal layer 225 so as to switch the states of the liquid crystal layer 225 by applying a voltage difference between the two electrode layers. Moreover, the liquid crystal changeable diffuser 220 may also have two alignment layers which are in contact with two opposite sides of the liquid crystal layer 225, respectively, so as to control the initial orientation of liquid crystal molecules in the liquid crystal layer 225.

The first detecting circuit layer 212 has a sensing wire distributed over the surface of the DOE 210. If the DOE 210 is broken or damaged, the sensing wire is broken, and the capacitance of the first detecting circuit layer 212 is changed, so that the breakage or damage of the DOE 210 may be detected. Similarly, the second detecting circuit layer 221 has a sensing wire distributed over the surface of the first transparent substrate 222, so that the breakage or damage of the first transparent substrate 222 may be detected by sensing the change of the capacitance of the second detecting circuit layer 221. Moreover, the third detecting circuit layer 223 has a sensing wire distributed over the surface of the second transparent substrate 224, so that the breakage or damage of the second transparent substrate 224 may be detected by sensing the change of the capacitance of the third detecting circuit layer 223. Besides, if a water drop exists on any one of the DOE 210, the first transparent substrate 222, and the second transparent substrate 224, the total capacitance of the DOE 210, the first transparent substrate 222, and the second transparent substrate 224 is changed, so that a water drop existing on or inside the changeable light source device 105 may be detected.

The camera 120 is disposed beside the changeable light source device 105 and configured to sense a reflected light 52 formed by the face 50 reflecting the light beam 132 from the optical film stack 200. As a result, a processor coupled to the camera 120 may recognize the face 50 according to the image of the face 50 detected by the camera 120.

In the optical film stack 200, the changeable light source device 105, and the face sensing module 100 according to this embodiment, since a conductive structure 230 is adopted to electrically connect the first detecting circuit layer 212, the second detecting circuit layer 221, and the third detecting circuit layer 223 respectively disposed on the DOE 210, the first transparent substrate 222, and the second transparent substrate 224, the breakage or damage of any one of the DOE 210, the first transparent substrate 222, and the second transparent substrate 224 or a water drop existing thereon may be detected. As a result, a safety detection function may be achieved.

In this embodiment, the DOE 210 has at least one first through hole 211, the first transparent substrate 222 has a second through hole 226, and the second transparent substrate 224 has a third through hole 227. The first through hole 211, the second through hole 226, and the third through hole 227 communicate with one another. The conductive structure 230 is inside the first through hole 211, the second through hole 226, and the third through hole 227.

When assembling the optical film stack 200, the DOE 210, the first transparent substrate 222, and the second transparent substrate 224 are drilled to from the first through hole 211, the second through hole 226, and the third through hole 227, respectively, wherein the DOE 210 and the first through hole 211 are exemplarily shown in FIG. 2A. Next, a metal layer 213 is coated on the inside walls of the first through hole 211, the second through hole 226, and the third through hole 227, wherein a part of the DOE 210 is exemplarily shown in FIG. 2B to show the metal layer 213 is coated on the inside wall of the first through hole 211. In this embodiment, the metal layer 213 is, for example, a gold layer. Then, referring to FIG. 2C, the DOE 210 is bonded to the liquid crystal changeable diffuser 220 through transparent glue, for example, optical clear resin. Metal glue, e.g. silver glue, is then filled in the first through hole 211, the second through hole 226, and the third through hole 227, so that the first detecting circuit layer 212, the second detecting circuit layer 221, and the third detecting circuit layer 223 are electrically connected with one another. In this embodiment, the first detecting circuit layer 212, the second detecting circuit layer 221, and the third detecting circuit layer 223 may be made of indium tin oxide or any other appropriate transparent conductive material.

Figure 3A:
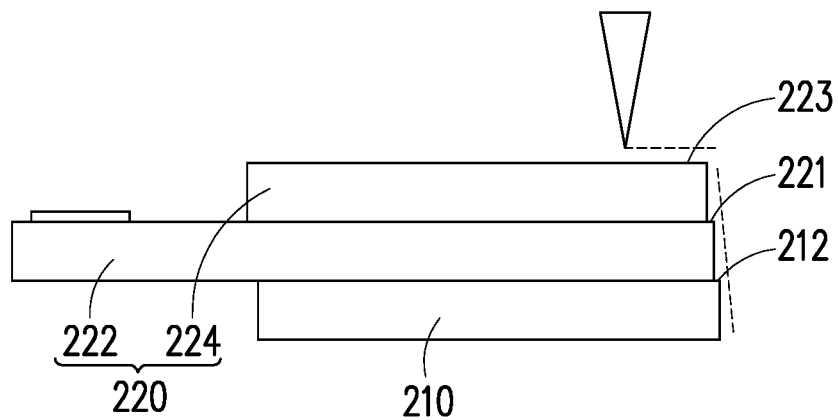
FIG. 3A and FIG. 3B are schematic perspective views showing an assembling process of an optical film stack according to another embodiment of the invention.
Figure 3B:
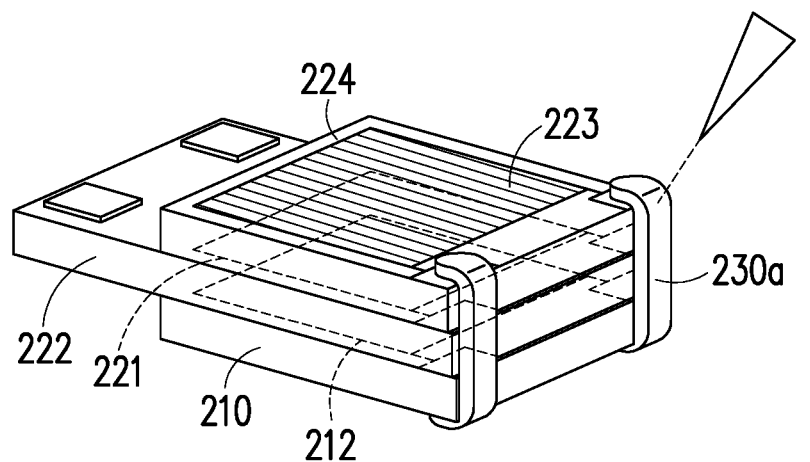

FIG. 3A and FIG. 3B are schematic perspective views showing an assembling process of an optical film stack according to another embodiment of the invention. Referring to FIG. 3A and FIG. 3B, the optical film stack 200a in this embodiment is similar to the optical film stack 200 in FIG. 2C, and the main differences therebetween are as follows. Referring to FIG. 3A first, when assembling the optical film stack 200, the DOE 210, the first transparent substrate 222, and the second transparent substrate 224 are bonded together in a way that the edge of the DOE 210 is not aligned with the edge of the first transparent substrate 222, and the edge of the first transparent substrate 222 is not aligned with the edge of the second transparent substrate 224. As a result, in this embodiment, the second transparent substrate 224 exposes the edge of the second detecting circuit layer 221, and the first transparent substrate 222 exposes the edge of the first detecting circuit layer 212 after the DOE 210, the first transparent substrate 222, and the second transparent substrate 224 are bonded together.

Then, referring to FIG. 3B, metal glue, e.g. silver glue, is dispensed on the edges of the DOE 210, the first transparent substrate 222, and the second transparent substrate 224 to form the conductive structure 230a which is in contact with the first detecting circuit layer 212, the second detecting circuit layer 221, and the third detecting circuit layer 223. For example, the conductive structure 230a is in contact with the exposed edge of the first detecting circuit layer 212 and the second detecting circuit layer 221 and the edge of the top surface of the third detecting circuit layer 223.

Figure 4:
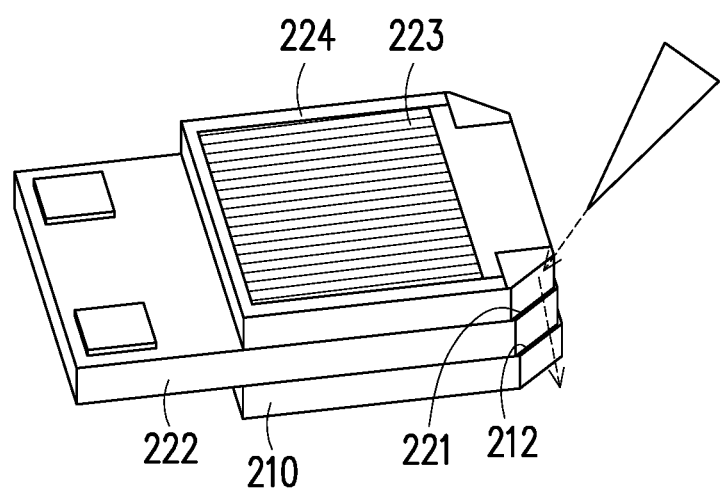
FIG. 4 is a schematic perspective view showing an assembling process of an optical film stack according to another embodiment of the invention.

FIG. 4 is a schematic perspective view showing an assembling process of an optical film stack according to another embodiment of the invention. Referring to FIG. 4, the assembling process in this embodiment is similar to the assembling process in FIG. 3A and FIG. 3B, and the main differences therebetween are as follows. In this embodiment, when assembling an optical film stack, the DOE 210, the first transparent substrate 222, and the second transparent substrate 224 may be chamfered in different extents, so that at least one corner of the DOE 210 is not aligned with a corresponding corner of the first transparent substrate 222, and the corresponding corner of the first transparent substrate 222 is not aligned with a corresponding corner of the second transparent substrate 224. As a result, in this embodiment, the second transparent substrate 224 exposes at least one corner of the second detecting circuit layer 221, and the first transparent substrate 222 exposes a corresponding corner of the first detecting circuit layer 212 after the DOE 210, the first transparent substrate 222, and the second transparent substrate 224 are bonded together.

Then, metal glue, e.g. silver glue, is dispensed on the corners of the DOE 210, the first transparent substrate 222, and the second transparent substrate 224 to form a conductive structure which is in contact with the first detecting circuit layer 212, the second detecting circuit layer 221, and the third detecting circuit layer 223. For example, the conductive structure 230 is in contact with the exposed corners of the first detecting circuit layer 212 and the second detecting circuit layer 221 and the corner of the top surface of the third detecting circuit layer 223.

Figure 5A:
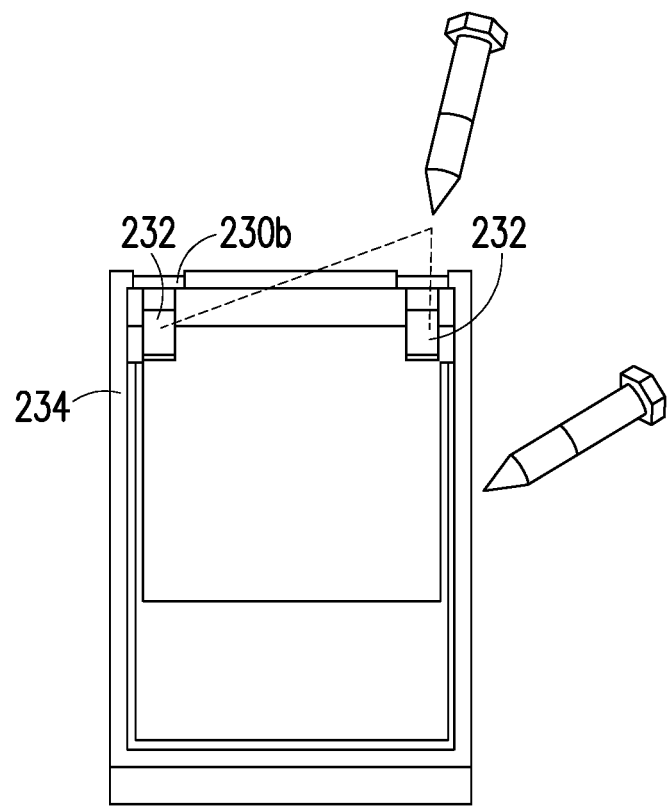
FIG. 5A to FIG. 5F are schematic perspective views showing an assembling process of an optical film stack according to another embodiment of the invention.
Figure 5B:
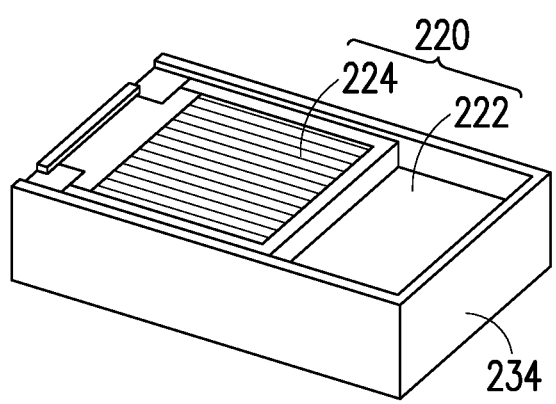
Figure 5C:
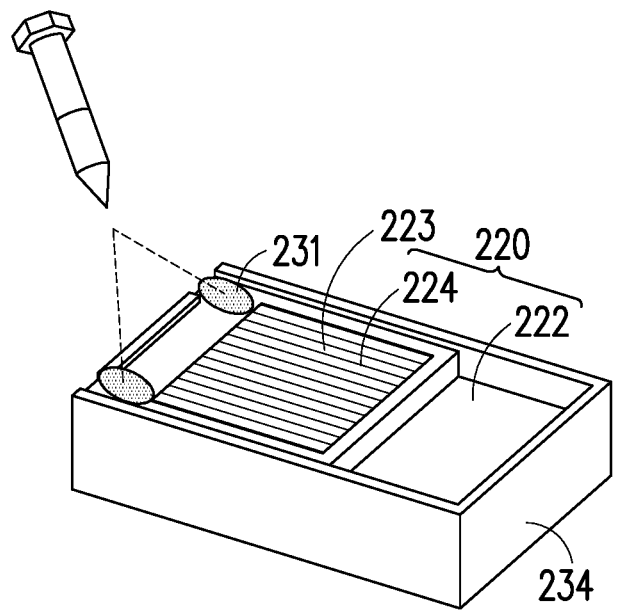
Figure 5D:
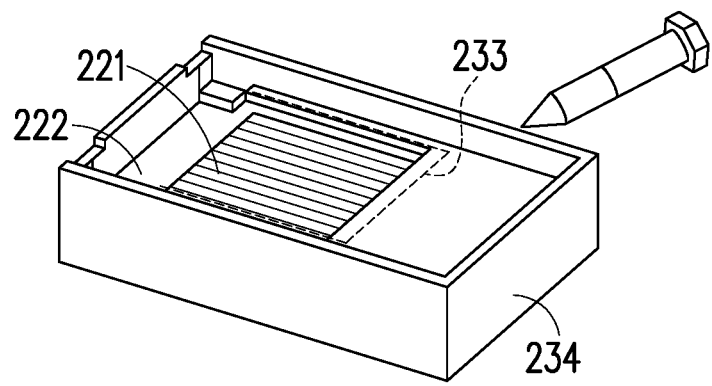
Figure 5E:
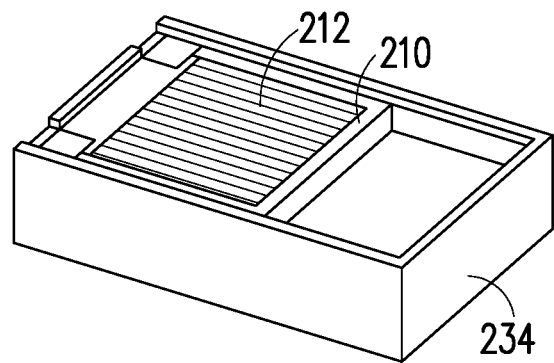
Figure 5F:
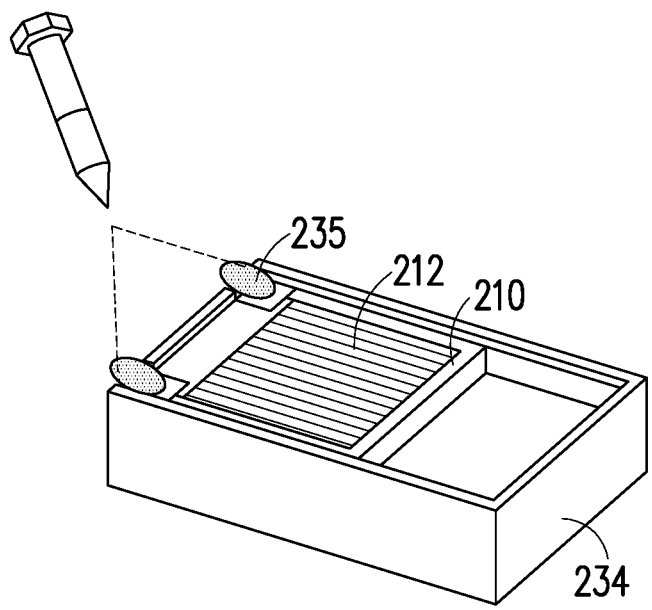
Figure 6:
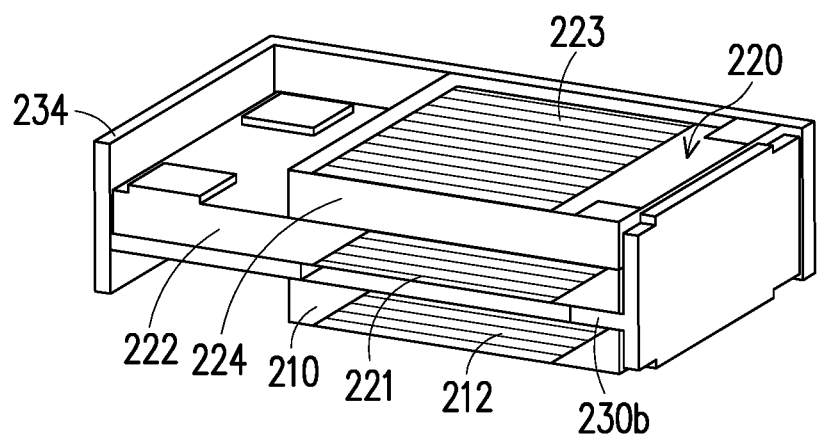
FIG. 6 is a partial perspective view of the optical film stack made by the assembling process shown in FIG. 5A to FIG. 5F and showing a cross section thereof.

FIG. 5A to FIG. 5F are schematic perspective views showing an assembling process of an optical film stack according to another embodiment of the invention, and FIG. 6 is a partial perspective view of the optical film stack made by the assembling process shown in FIG. 5A to FIG. 5F and showing a cross section thereof. Referring to FIG. 5A to FIG. 5F and FIG. 6, the optical film stack 200b in this embodiment is similar to the optical film stack 200 in FIG. 2C, and the main differences therebetween are as follows. In this embodiment, the optical film stack 200b further includes an insulating frame 234, and the DOE 210 and the liquid crystal changeable diffuser 220 are respectively disposed on two opposite sides of the insulating frame 234. The conductive structure 230b includes at least one lead frame fixed by the insulating frame 234 and electrically connected with the first detecting circuit layer 212, the second detecting circuit layer 221, and the third detecting circuit layer 223. In this embodiment, the lead frame and the insulating frame 234 are made by an insert molding method, and a part of the lead frame is wrapped by the insulating frame 234.

In this embodiment, when assembling the optical film stack 200b, referring to FIG. 5A, metal glue (e.g. silver glue) is dispensed on the pads 232 of the lead frame, and ultraviolet (UV) glue is dispensed on one side of the insulating frame 234. Then, referring to FIG. 5B, the liquid crystal changeable diffuser 220 is assembled on the insulating frame 234 through the UV glue, and the second detecting circuit layer 221 is electrically connected to the pads 232 through the metal glue. The UV glue is then cured. Next, referring to FIG. 5C, metal glue (e.g. silver glue) is dispensed on the lead frame and the third detecting circuit layer 223 so as to electrically connect the third detecting circuit layer 223 with the lead frame. Afterwards, referring to FIG. 5D, the insulating frame 234 is flipped over, and UV glue 233 is dispensed on the other side of the insulating frame 234. Then, referring to FIG. 5E, the DOE 210 is assembled on the insulating frame 234. After that referring to FIG. 5F, metal glue 235 (e.g. silver glue) is dispensed on the first detecting circuit layer 212 and the lead frame, so that the first detecting circuit layer 212 is electrically connected to the lead frame through the metal glue 235, and the assembling of the optical film stack 200b is finished. Consequently, the lead frame and the metal glue of the conductive structure 230b electrically connect the first detecting circuit layer 212, the second detecting circuit layer 221, and the third detecting circuit layer 223 together.

In the optical film stack, the changeable light source device, and the face sensing module according to the embodiment of the invention, since a conductive structure is adopted to electrically connect the first detecting circuit layer, the second detecting circuit layer, and the third detecting circuit layer respectively disposed on the DOE, the first transparent substrate, and the second transparent substrate, the breakage or damage of any one of the DOE, the first transparent substrate, and the second transparent substrate or a water drop existing thereon may be detected. As a result, a safety detection function may be achieved.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. An optical film stack comprising:
   a diffractive optical element (DOE);
   a first detecting circuit layer disposed on the DOE;
   a liquid crystal changeable diffuser disposed beside the DOE and comprising:
     a first transparent substrate;
     a second detecting circuit layer disposed on the first transparent substrate;
     a second transparent substrate disposed beside the first transparent substrate;
     a third detecting circuit layer disposed on the second transparent substrate; and
     a liquid crystal layer disposed between the first transparent substrate and the second transparent substrate; and
   a conductive structure electrically connecting and shorting the first detecting circuit layer, the second detecting circuit layer, and the third detecting circuit layer.

2. The optical film stack according to claim 1, wherein the DOE has a first through hole, the first transparent substrate has a second through hole, and the second transparent substrate has a third through hole; the first through hole, the second through hole, and the third through hole communicate with one another; the conductive structure is inside the first through hole, the second through hole, and the third through hole.

3. The optical film stack according to claim 1, wherein an edge of the DOE is not aligned with an edge of the first transparent substrate, the edge of the first transparent substrate is not aligned with an edge of the second transparent substrate, and the conductive structure is in contact with the first detecting circuit layer, the second detecting circuit layer, and the third detecting circuit layer.

4. The optical film stack according to claim 1, wherein a corner of the DOE is not aligned with a corner of the first transparent substrate, the corner of the first transparent substrate is not aligned with a corner of the second transparent substrate, and the conductive structure is in contact with the first detecting circuit layer, the second detecting circuit layer, and the third detecting circuit layer.

5. The optical film stack according to claim 1 further comprising an insulating frame, wherein the DOE and the liquid crystal changeable diffuser are respectively disposed on two opposite sides of the insulating frame, and the conductive structure comprises a lead frame fixed by the insulating frame and electrically connected with the first detecting circuit layer, the second detecting circuit layer, and the third detecting circuit layer.

6. A changeable light source device comprising:
a light source configured to emit a light beam; and
an optical film stack comprising:
a diffractive optical element (DOE) disposed on a path of the light beam;
a first detecting circuit layer disposed on the DOE;
a liquid crystal changeable diffuser disposed beside the DOE and on the path of the light beam, the liquid crystal changeable diffuser comprising:
a first transparent substrate;
a second detecting circuit layer disposed on the first transparent substrate;
a second transparent substrate disposed beside the first transparent substrate;
a third detecting circuit layer disposed on the second transparent substrate; and
a liquid crystal layer disposed between the first transparent substrate and the second transparent substrate; and
a conductive structure electrically connecting and shorting the first detecting circuit layer, the second detecting circuit layer, and the third detecting circuit layer.

7. The changeable light source device according to claim 6, wherein the DOE has a first through hole, the first transparent substrate has a second through hole, and the second transparent substrate has a third through hole; the first through hole, the second through hole, and the third through hole communicate with one another; the conductive structure is inside the first through hole, the second through hole, and the third through hole.

8. The changeable light source device according to claim 6, wherein an edge of the DOE is not aligned with an edge of the first transparent substrate, the edge of the first transparent substrate is not aligned with an edge of the second transparent substrate, and the conductive structure is in contact with the first detecting circuit layer, the second detecting circuit layer, and the third detecting circuit layer.

9. The changeable light source device according to claim 6, wherein a corner of the DOE is not aligned with a corner of the first transparent substrate, the corner of the first transparent substrate is not aligned with a corner of the second transparent substrate, and the conductive structure is in contact with the first detecting circuit layer, the second detecting circuit layer, and the third detecting circuit layer.

10. The changeable light source device according to claim 6 further comprising an insulating frame, wherein the DOE and the liquid crystal changeable diffuser are respectively disposed on two opposite sides of the insulating frame, and the conductive structure comprises a lead frame fixed by the insulating frame and electrically connected with the first detecting circuit layer, the second detecting circuit layer, and the third detecting circuit layer.

11. The changeable light source device according to claim 6, wherein the light source is a laser emitter.

12. A face sensing module comprising:
a changeable light source device comprising:
a light source configured to emit a light beam; and
an optical film stack comprising:
a diffractive optical element (DOE) disposed on a path of the light beam;
a first detecting circuit layer disposed on the DOE;
a liquid crystal changeable diffuser disposed beside the DOE and on the path of the light beam, the liquid crystal changeable diffuser comprising:
a first transparent substrate;
a second detecting circuit layer disposed on the first transparent substrate;
a second transparent substrate disposed beside the first transparent substrate;
a third detecting circuit layer disposed on the second transparent substrate; and
a liquid crystal layer disposed between the first transparent substrate and the second transparent substrate; and
a conductive structure electrically connecting and shorting the first detecting circuit layer, the second detecting circuit layer, and the third detecting circuit layer; and
a camera disposed beside the changeable light source device and configured to sense a reflected light formed by a face reflecting the light beam from the optical film stack.

13. The face sensing module according to claim 12, wherein the DOE has a first through hole, the first transparent substrate has a second through hole, and the second transparent substrate has a third through hole; the first through hole, the second through hole, and the third through hole communicate with one another; the conductive structure is inside the first through hole, the second through hole, and the third through hole.

14. The face sensing module according to claim 12, wherein an edge of the DOE is not aligned with an edge of the first transparent substrate, the edge of the first transparent substrate is not aligned with an edge of the second transparent substrate, and the conductive structure is in contact with the first detecting circuit layer, the second detecting circuit layer, and the third detecting circuit layer.

15. The face sensing module according to claim 12, wherein a corner of the DOE is not aligned with a corner of the first transparent substrate, the corner of the first transparent substrate is not aligned with a corner of the second transparent substrate, and the conductive structure is in contact with the first detecting circuit layer, the second detecting circuit layer, and the third detecting circuit layer.

16. The face sensing module according to claim 12 further comprising an insulating frame, wherein the DOE and the liquid crystal changeable diffuser are respectively disposed on two opposite sides of the insulating frame, and the conductive structure comprises a lead frame fixed by the insulating frame and electrically connected with the first detecting circuit layer, the second detecting circuit layer, and the third detecting circuit layer.

17. The changeable light source device according to claim 12, wherein the light source is a laser emitter.

* * * * *